March 8, 1949.　　　　R. E. FOSTER　　　　2,463,860
MOUNT FOR PORTABLE CHAIN SAWS
Filed June 20, 1944
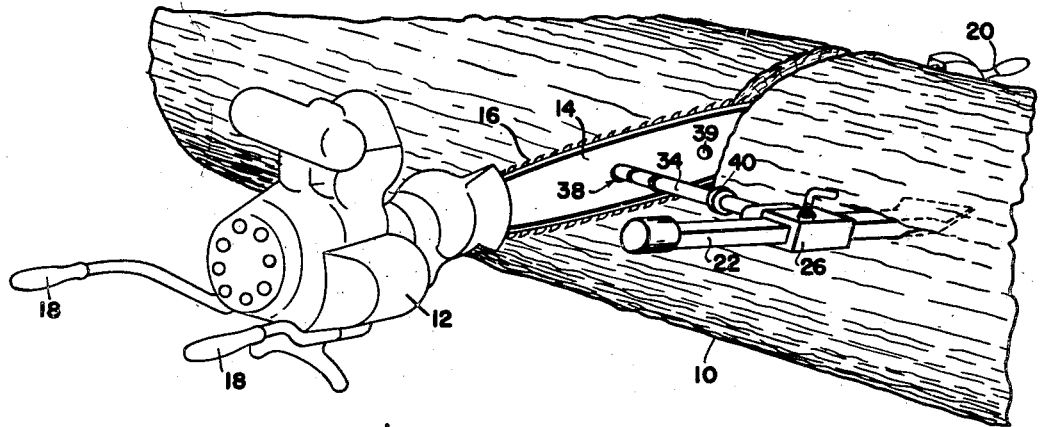
FIG_1
FIG_2
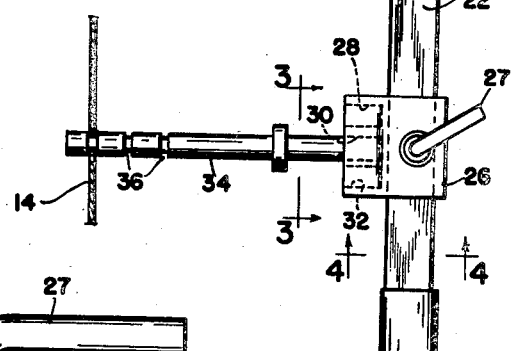
FIG_3
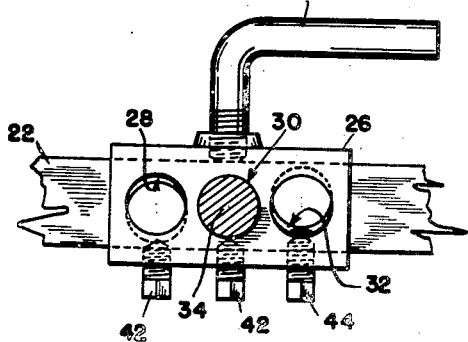
FIG_4
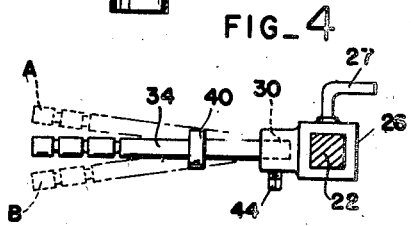
ROY E. FOSTER
Inventor
By
Attorneys Patented Mar. 8, 1949

2,463,860

UNITED STATES PATENT OFFICE 2,463,860

MOUNT FOR PORTABLE CHAIN SAWS

Roy E. Foster, Centralia, Wash.

Application June 20, 1944, Serial No. 541,177

1 Claim. (Cl. 143—157)

This invention relates to a mount for portable chain saws and, more particularly, is a device to be variably anchored in a log, for supporting a power saw mechanism in a variety of cutting positions.

In recent years there has been considerable development in the use of powered chain saws in the logging industry for the purpose of felling and cutting timber. The customary practice is to provide a cutter bar, which is a steel guide blade having a handle at one end, and a motor at the opposite end, which is usually provided with handles for manual manipulation of the saw. An endless cutting chain provided with cutter and raker teeth is mounted to travel around the cutter bar at speeds up to 1500 ft. per minute. Power is transmitted from a motor, usually a gasoline engine, to move the chain. Depending upon the size of the saw and its motor, such mechanisms weigh from 80 to 150 lbs., and, because of their length, are unwieldy to such an extent that it usually requires one man at each end of the saw to handle the mechanism in operation.

It is an object of the present invention to provide a supporting mechanism for power saws by the use of which a variety of cutting lines may be obtained.

It is another object of this invention to provide a mounting mechanism for power saws which will permit the operation of a heavy and unwieldy saw mechanism by a single operator.

A still further object of the invention is the provision, in a power saw mounting mechanism, of means for altering the cutting angles to provide several such, without detaching the mounting mechanism from the timber to which it is secured.

The foregoing objects, and other ancillary thereto, I prefer to accomplish as follows:

According to the preferred embodiment of my invention, I provide a pointed drive arm, having considerable length, and a generally rectangular cross-section. Mounted upon the drive arm is a socketed member, including means for clamping said member to the drive arm at a desired location. Such clamp member has a plurality of sockets, all directed outwardly from one side, but having various inclinations to each other, in which the end of a lateral support bar may be inserted and secured as desired. The lateral support bar comprises an elongated shaft, having a plurality of annular grooves spaced apart from each other adjacent the outboard end. The guide blade of a power saw is provided with several holes, each of which is large enough to receive the outboard end of the lateral support bar, and, when properly positioned, the guide blade rests in one of the annular grooves therein, so that it can be pivoted thereabout as a cutting operation progresses or as an operator may desire.

The novel features that I consider characteristic of my invention are set forth with particularity in the appended claim. The invention itself, however, both as to organization and its method of operation, together with additional objects and advantages thereof, will best be understood from the following description of a specific embodiment when read in connection with the accompanying drawings, in which:

Figure 1 is a perspective view of a power saw as it appears supported in sawing relation to a timber by means of my saw mount;

Figure 2 is a plan view of the assembled elements of the saw mount;

Figure 3 is a sectional view taken on line 3—3 of Figure 2; and

Figure 4 is a view taken on line 4—4 of Figure 2.

A saw mount, for the uses mentioned herein, to be fully useful, must be simple of construction and capable of being mounted in a log with facility. With the construction and assembly of parts more fully described hereinafter, I have been able to accomplish the objects of my invention. Referring specifically to Figure 1, the numeral 10 designates a log or timber, with portions broken away for convenience of illustration, as it would appear lying along the ground. A power saw, comprising an engine 12 and its appurtenances, has the elongated guide blade 14, on the edges of which travels the endless chain saw 16, to which power is supplied from the motive mechanism 12. Suitable handles 18, attached to engine 12, permit manipulation of the motor unit, and the auxiliary handle 20, at the opposite end of blade 14, is useful to an assistant of the saw operator in moving and manipulating the saw.

As can best be seen in Figure 2, my saw mount comprises a drive arm 22, having a pointed end 24 at one end. As shown throughout the drawings, arm 22 is generally rectangular in cross section. The numeral 26 designates a socketed member which encloses, and is slidably movable on the arm 22. For fixedly positioning member 26 as desired, the clamp screw 27 is employed, which, on being turned, presses its point down upon the arm 22 and locks the two parts together. Along one side, member 26 has a plurality of sockets 28, 30 and 32, in any of which may be fitted the lateral support bar 34.

In Figure 3 I show the lateral support bar 34 in the hole 30, which I designate the horizontal socket. Socket 28 has an upward inclination with respect to socket 30, and socket 32 has a downward inclination with respect to socket 30, so that when the lateral arm 34 is placed in socket 28, it will assume the dotted line position indicated A in Figure 4; and when it is placed in socket 32, it will assume the dotted line position B of Figure 4. These various angular positionings of the lateral support arm greatly facilitate the utility of my saw mount in its use in the field.

The bar 34 has several annular grooves 36 spaced apart along its length, and the guide blade 14, by means of one of the holes 38 therein, can be fitted to the lateral bar and positioned in one of the grooves wherein it depends.

A sawyer employing my saw-supporting mechanism first drives the arm 22 into a log to such an extent that it is firmly positioned therein. He next adjusts member 26 along the length of the arm, more or less in accordance with the size of the log which he is to cut. Normally the initial cut will be made at right angles to the axis of the timber, and, in that case, the arm 34 will be positioned in socket 30. The saw may then be introduced into the log from the top downward as the guide blade is swung about the axis of bar 34 to pass into the timber and therethrough, if possible.

Under certain circumstances, a fallen log will rest upon two high points near the ends, and tend to sag in the middle. In such a case, a certain amount of right angular cuttings can be made through the log, as though there were no compression thereon, but, when a sufficient amount of wood has been cut away to permit the log to sag further, a bind will occur and the cutter will be pinched and retarded in its operation. To overcome this difficulty, the sawyer withdraws the saw and detaches it from the mount. The support bar 34 can then be removed from socket 30, and placed in socket 28 to be disposed along inclination A of Figure 4. The saw blade is then remounted on the support arm 34 as before, but it will be seen that the blade is positioned at an inclined angle to the previously made cut, and, when the saw is started in operation, a second cut will be made upon the log. This cut will have a tendency to converge with the first cut. In this manner, a wedge-shaped portion of the timber is removed to relieve the strain and to permit the log to be cut further through.

My mechanism is, in a similar manner and according to the skill of the workman sawyers, useful for undercutting as well as for felling timbers as they stand upon their stumps.

By employing different holes 38, 39, and so forth, and by variously positioning member 26 along the length of arm 22, it is possible to adapt the saw to various sizes of timbers, or various sizes of saws, to a cutting operation, but with a single operator.

In order to facilitate side sawing, I have provided the arm 34 with a collar or shoulder 40 which serves as a rest for the saw blade during such times as the blade is laid on its side, as when a tree is being felled. The blade is slipped over the upright positioned support arm end and brought to rest on collar 40 in spaced apart relation to member 26 or its sockets. In this arrangement the blade may be pivoted as before described to present the saw teeth to the tree trunk.

Although I have shown and described a specific embodiment of my invention, I am fully aware that many modifications thereof are possible. My invention therefore is not to be restricted, except insofar as is necessitated by the prior art and by the spirit of the sub-showing claim.

Having thus described my invention, I claim:

A portable power saw, comprising: a guide blade having a plurality of aligned transverse perforations, a pointed arm of rectangular cross-section to be driven into the fiber of a timber to be sawed, a slide member encircling and movable along said arm, locking means for securing said member to said arm in a predetermined position, said slide member having a plurality of sockets laterally directed with respect to said arm, said sockets having varying respective inclinations, and a support bar to be selectively seated in one of said sockets and to pass through one of the perforations of said guide blade whereby the saw blade will be mounted pivotally transversely of the timber to which the mount is attached.

ROY E. FOSTER.

REFERENCES CITED

The following references are of record in the file of this patent:

UNITED STATES PATENTS

| Number | Name | Date |
|---|---|---|
| 948,836 | Whitworth | Feb. 8, 1910 |
| 993,838 | Kessler | May 30, 1911 |
| 1,046,800 | Kawasaki | Dec. 10, 1912 |
| 1,054,517 | Donahue | Feb. 25, 1913 |
| 1,273,394 | Meyer | July 23, 1918 |
| 1,467,150 | Frere | Sept. 4, 1923 |
| 1,574,152 | Jennings | Feb. 23, 1926 |